July 20, 1965 L. R. ENGELBRECHT 3,196,354

SIGNAL TO NOISE RATIO CONTROLLED SQUELCH CIRCUIT

Filed June 20, 1962 2 Sheets-Sheet 1

INVENTOR.
Lloyd R. Engelbrecht
BY
Mueller & Aichele
ATTYS.

SIGNAL TO NOISE RATIO CONTROLLED SQUELCH CIRCUIT

Filed June 20, 1962 2 Sheets-Sheet 2

INVENTOR.
Lloyd R. Engelbrecht
BY Mueller & Aichele
ATTYS.

United States Patent Office 3,196,354

Patented July 20, 1965

3,196,354

SIGNAL TO NOISE RATIO CONTROLLED SQUELCH CIRCUIT

Lloyd R. Engelbrecht, Westchester, Ill., assignor to Motorola, Inc., Chicago, Ill., a corporation of Illinois Filed June 20, 1962, Ser. No. 203,878
8 Claims. (Cl. 325—319)

The present invention relates to communication receiving systems and more particularly to improved noise squelch circuits for automatically muting the receiver output when no signal is received or whenever the signal-to-noise ratio of a received signal drops below a tolerable level.

It is a desirable and often essential practice to provide means for muting communication receivers when the noise level becomes too high or during periods of no signal reception and only noise is present in the receiver. Although there are many known types of signal-to-noise operating squelch circuits, typically most such circuits require the existance of a carrier wave for operation. In frequency modulated receivers use is made of the fact that noise is reduced by the inherent limiting action of the receiver in the presence of a carrier wave to provide the desired squelch operation. Other types of squelch circuits, such as those adapted for use with amplitude modulated signals, rectify and compare the carrier and the noise appearing at the output of an auxiliary limited to provide squelch operation. Still other squelch circuits utilize a filtering arrangement to distinguish between modulated signals appearing in a selected frequency range and noise signals appearing outside the selected range. However, single sideband suppressed carrier systems present unique problems in that there is insufficient carrier present to provide a sharp distinction between its presence and absence for squelch operation. In addition, voice modulated single sideband signals have somewhat similar characteristics to noise, and selective filtering becomes difficult since the voice modulated signal and the noise occupy the same portion of the frequency spectrum.

It is therefore an object of the present invention to provide an improved noise operated squelch system for communications receivers.

Another object is to provide a signal-to-noise operating squelch circuit which may be operated by voice modulated single sideband signals.

A further object is the provision of the signal-to-noise squelch circuit which does not require the presence of a carrier wave for operation and which will respond to modulation signals of different types either with or without a carrier wave.

A feature of the present invention is the provision of a signal sampling circuit for squelch operation having means responsive to the number of envelope minima in a received modulated signal wave to mute the receiver when only noise is present.

Another feature is the provision of limiting means to strip all amplitude information from the received modulated signal except envelope minima which do not exceed the limiting level, and means for converting the number of minima to pulses so that increased envelope minima resulting from increased noise will operate a squelch circuit.

A further feature is the provision of limiting and linear detecting means for providing pulses indicative of envelope minima crossover points in a received modulation sideband signal, and a dual time constant rectifier circuit for providing a control voltage in response to the number of such envelope minima crossovers to produce squelch operation.

Further objects, features and attending advantages of the invention will be apparent from a consideration of the following description when taken in connection with the accompanying drawings, in which.

Figure 1:
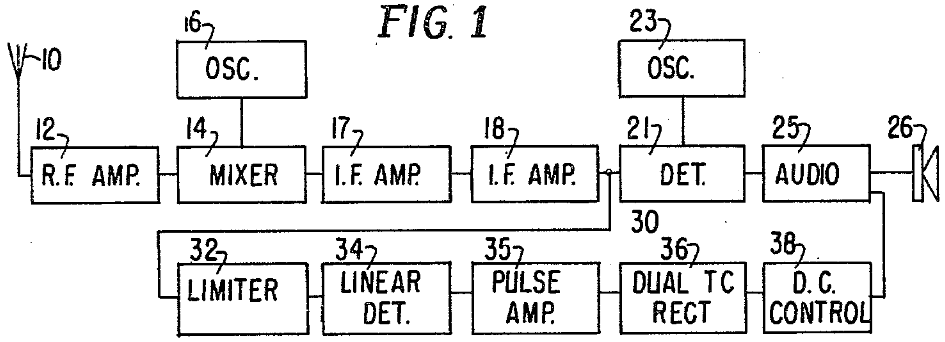
FIG. 1 is a block diagram of a receiver utilizing the invention.

The invention provides a signal-to-noise operating squelch circuit for use with communication receivers. The received modulated signal is sampled from a signal translation stage of the receiver and fed through limiting means which is adapted to strip off all amplitude information except envelope minima which do not exceed the limiting level. A linear detector converts the envelope minima to pulses which are amplified to a desired level and are further converted to a D.C. voltage by a rectifier having a short charge, long discharge time constant output circuit associated therewith. The dual time constant rectifier circuit functions as an integrator or counter, and provides a D.C. output voltage which is proportional to the number of pulses received from the linear detector. The D.C. output of the rectifier circuit is used to gate an amplifier stage in the receiver to produce the desired squelch operation. Since noise signals characteristically provide more envelope minima and hence more pulses than sideband modulated signals, the amplifier is gated off when only noise is recived or when the signal-to-noise ratio is below a predetermined level. The system is thereby able to discriminate between noise and voice or other types of envelope modulation without relying on a presence of a carrier wave for proper squelch operation.

Since voice modulated suppressed carrier signal sideband signals represent an instance wherein the modulation signal and noise have a high degree of similarity, and wherein detection of the envelope minima crossover points is most critical, the invention is shown for use with a suppressed carrier single sideband receiver. It is to be noted that the circuit of the invention is particularly advantageous for use with receivers where the modulation bandwidth is equal to the information bandwidth, as is the case for single sideband modulation. However, the squelch circuit hereinafter described also finds utility in receiving systems where the modulation bandwidth is greater than the information bandwidth, as is the case with amplitude modulation, frequency modulation, and with pulse modulation such as pulse position modulation and pulse amplitude modulaton. For example, in receivers having amplitude modulation or frequency modulation, there will ordinarily be no envelope minima crossover points whenever noise is not present, but detectable envelope minima which do not exceed the limiting level will occur whenever noise modulation is superimposed upon the received signal. In addition, the present squelch circuit may be adapted to distinguish between noise and the minima produced by pulse modulation of the types mentioned.

Although in the particular embodiment shown the intermediate frequency signal is sampled to provide the signal from which squelch operation is derived, it is to be understood that the circuit of the invention is equally responsive to the incoming radio frequency signal and may be used in receivers of the type wherein there is direct detection of a tuned R.-F. signal, as well as other types of receivers in which heterodyning is not employed.

In the receiving system of FIG. 1, antenna 10 is connected to radio frequency amplifier 12 from which the amplified and selected signals are applied to mixer stage 14. Signals from local oscillator 16 are also applied to mixer stage 14 to provide an intermediate frequency signal which is successively applied to intermediate frequency amplifier stages 17 and 18. Signals from IF amplifier 18 are demodulated in detector 21. Oscillator 23 is also connected to detector 21 to provide a signal for reinserting the carrier for proper operation of the detector circuit. It will be understood by those skilled in the art that various specific forms of a suitable detector circuit may be used depending upon the characteristics of the overall communication system of this type. In addition, oscillator 23 may be of various types to provide reinsertion of the carrier for operation of detector 21 in a manner conventional for the reception of suppressed carrier single sideband signals. The demodulated signal of detector 21 is supplied to suitable audio frequency amplifier stages 25 and to loudspeaker 26.

A portion of the intermediate frequency signal is coupled by lead 30 to the input of limiter 32. Limiter 32 may include one or more stages to provide sufficient limiting so that virtually all of the amplitude information is stripped off the signal supplied on lead 30 except envelope minima which do not exceed the limiting level. The output of limiter 32 is supplied to linear envelope detector 34. Envelope minima which do not exceed the limiting level provided by limiter 32 are therein converted into pulses, one pulse for each minimum by detector 34. These pulses are amplified to a desired level by pulse amplifier 35 and are converted to a direct current signal having a level proportional to the number of detected minima by dual time constant rectifier circuit 36.

Rectifier circuit 36 includes a short charge, long discharge time constant filtering arrangement so that an average D.C. voltage level is produced in response to the number of pulses received to pulse amplifier 35. The direct current output of rectifier circuit 36 is connected to a D.C. control circuit 38. D.C. control circuit 38 includes a direct current amplifier or a D.C. voltage responsive switching arrangement which provides a control signal to be coupled to the audio amplifier stage 25 of the receiver system. Typically the output of D.C. control circuit 38 is connected to the control electrode of the amplifying device of stage 25. However, the output of control circuit 38 may be connected to a D.C. relay or other voltage responsive device to open the audio of the receiver in the presence of objectionably high noise levels. Thus, if the output of D.C. control circuit 38 is at a sufficiently high level, which in turn is indicative of the number of pulses received by rectifier circuit 36, audio amplifier 25 is biased to cutoff to squelch the receiver.

Figure 2:
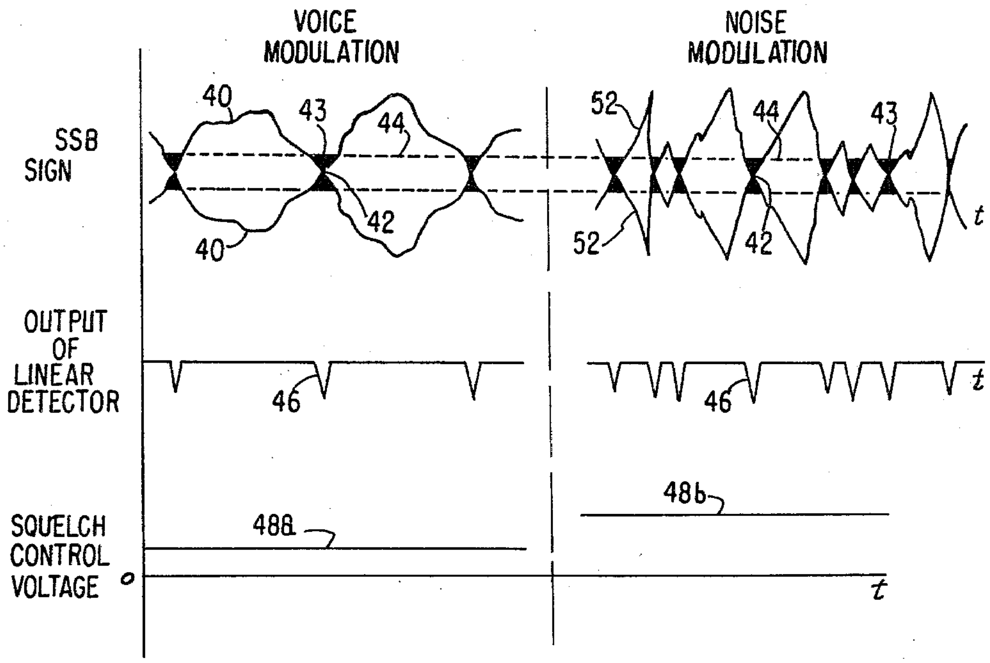
FIG. 2 is a plurality of curves illustrating the operation of the invention.

Referring now to the waveforms of FIG. 2, operation of the squelch circuit of this invention may be readily understood. Envelope 40 represents typical but simplified single sideband modulation signals in the absence of an appreciable carrier. Each envelope 40 represents a fundamental tone signal with harmonic components which may be caused, for example, by voice modulation. It should be noted that since the fundamental component of voice modulated signals fall somewhere in the range of 300 to 900 cycles per second, the modulation envelope for voice modulation is somewhat periodic in form. Further, in form. Further, in the absence of a carrier there are in single sideband signals periodic phase reversals and/or crossover points 42 to provide a plurality of voids or minima 43 in the modulation enevelope. When limiting level 44 is set by limiter 32, all amplitude information is stripped from envelope 40 and the only signal information supplied to linear detector 34 are envelope minima 43. Accordingly, the output of linear detector 34 appears as a plurality of pulses 46. When amplified and detected by rectifier circuit 36, these pulses establish a D.C. output signal 48*a*. Because of the short charge time constant of rectifier 36, the level of D.C. voltage 48*a* is readily responsive to the number of pulses supplied from linear detector 34. On the other hand, the long discharge time constant of rectifier 36 maintains the level of D.C. voltage 48*a* at a constant level for relatively long periods of time.

When there is no received signal or when the noise modulation becomes excessive, the sideband modulation components take the form shown by waveforms 52. It should be noted that noise envelope 52, simplified for the purposes of illustration, results in an increase in crossover points 42 and hence envelope minima 43. This provides an increase in the number of pulses 46, which pulses have a more or less random distribution. Since the D.C. voltage level of rectifier 36 is rapidly responsive to the number of pulses received and maintains this level for relatively long periods of time, the control voltage rapidly increases to level 48*b*. This new level is supplied by D.C. amplifier 38 to bias audio amplifier stage 25 to cutoff. It is therefore apparent that when the number of pulses supplied by the linear detector 34 increases, as is the case when noise in the system increases, squelch control is achieved. By choice of limiting level 44 and by adjustment of the biasing arrangement of amplifier 25 it is possible to provide squelch operation when the noise increases a predetermined amount. Satisfactory squelch operation is readily obtained when there is a 2-to-1 increase in the number of pulses 46 provided by linear detector 34, a condition which has been found to occur when the number of envelope minima produced by voice alone are compared with those produced by noise alone in a single sideband receiver.

It is readily apparent from FIG. 2 that when a signal component 40 has a fixed carrier exceeding limiting level 44, there are no envelope crossovers and linear detector 34 will not provide any output pulses 46. However, in the absence of a received carrier or in the presence of excessive noise, envelope minima 43 will occur to thereby produce a series of pulses 46 to provide a squelch control voltage. Thus, the sensitivity of the squelch control circuit of the invention is even greater when used with communication receivers having a fixed carrier as is the case with conventional amplitude or frequency modulated systems. Further, when substantially periodic modulation such as pulse position modulation or pulse amplitude modulation is employed, a relatively constant number of pulses 46 are present so that squelch control voltage level 48*a* can be readily set. In the absence of such signals when only noise is present, or in the presence of excessive noise, the number of pulses 46 provided by noise crossover is increased so that squelch operation is obtained as set forth above.

Figure 3:
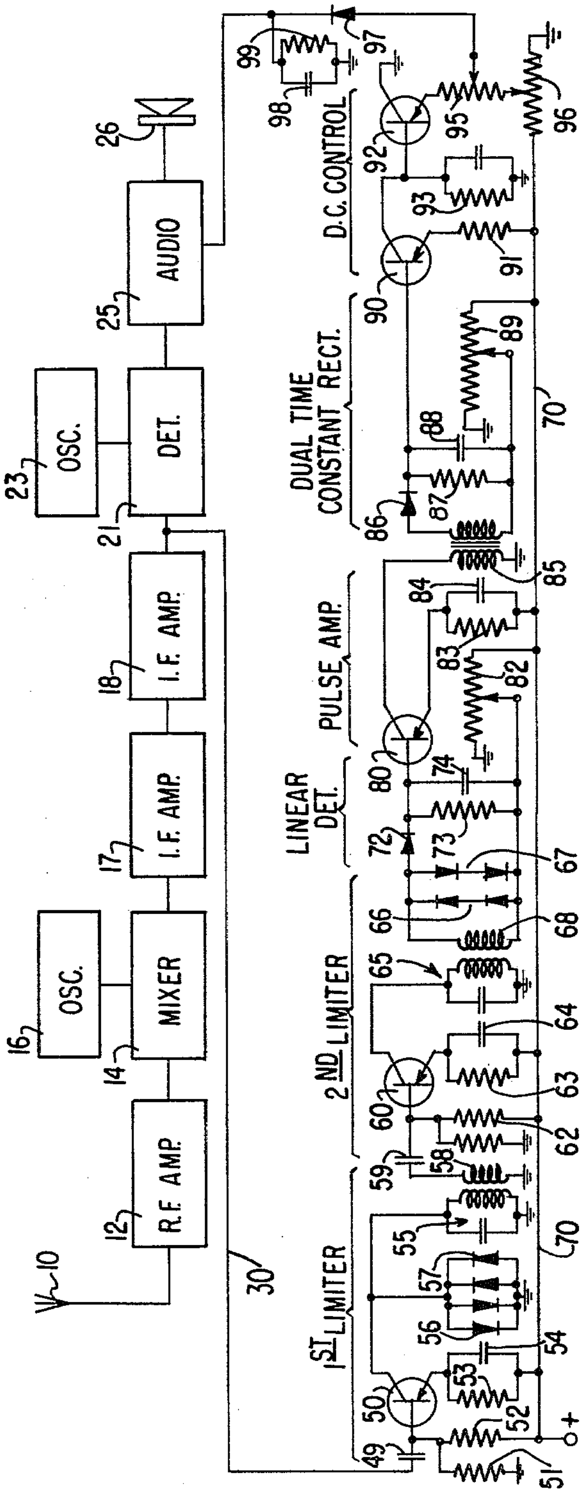
FIG. 3 is a detailed schematic of a portion of FIG. 1.

A typical successful circuit embodiment of the squelch circuit of the present invention, adapted for use with a single sideband receiver of the type set forth in FIG. 1, is illustrated in FIG. 3. The IF signal appearing on lead 30 is coupled by capacitor 49 to the base input electrode of transistor 50. Resistors 51 and 52 are connected between B+ lead 70 and ground to form a voltage divider to supply base voltage for transistor 50, while emitter bias is supplied by resistor 53 suitably bypassed by capacitor 54. The output signal of transistor 50 is developed across tuned circuit 55, connected between its collector electrode and ground reference potential. Accordingly, transistor 50 functions as a conventional tuned amplifier stage. Limiting action is provided by a plurality of diodes 56 and 57, connected back-to-back between the output collector electrode of transistor 50 and ground reference potential. These diodes function to clip the signal amplified by transistor 50 at a predetermined level. The clipped output of transistor 50 is coupled by winding 58 and capacitor 59 to the input base electrode of transistor 60. Resistors 61 and 62 provide base voltage for transistor 60 while emitter bias is supplied by resistor 63, bypassed by capacitor 64. The output of transistor 60 is developed across tuned circuit 65 coupled between its collector electrode and ground reference potential. Accordingly, transistor 60 is also connected as a conventional tuned amplifier stage to increase the signal level of the clipped output of the transistor 50. Diodes 66 and 67, connected back-to-back across winding 68, provide further clipping action for the amplified signal.

Because of the increased signal level it is desirable to connect a plurality of diodes in series across winding 66.

In the particular circuit embodiment shown diodes 56, 57, 66 and 67 are of the silicon type having a predetermined forward threshold value, and accordingly the knee of their forward characteristic curve is utilized to establish the limiting level. It is to be understood, however, that other types of limiters, such as those utilizing biased diodes, may also be used. These two tandem limiting stages, including transistors 50 and 60 and diodes 56, 57, 66 and 67 successively amplify and clip the intermediate frequency signal to perform the required limiting action of limiter 32 in FIG. 1, thereby limiting the IF signal to level 44 as shown in FIG. 2. Limiting is accomplished by the clipping action of the back-to-back diodes connected across the output of each transistor stage, while the transistors provide amplification of the IF signal to a desired level.

The amplified and clipped IF signal is coupled to detector diode 72. As shown in FIG. 2, this signal has been stripped of all amplitude information except envelope minima which do not exceed limiting level 44. Diode 72, resistor 73 and capacitor 74 form a linear envelope detector circuit of the conventional type to provide a series of output pulses 46 indicative of such envelope minima. The output of the linear detector is coupled to the input base electrode of pulse transistor amplifier 80. A variable voltage divider including resistor 82, connected between B+ lead 70 and ground, provides base voltage for transistor 80 and a biasing voltage for diode 72 to enable the level of the pulses to be set. Resistor 83, bypassed by capacitor 84, provides emitter bias for transistor 80.

The pulse output appearing at the collector electrode of transistor 80 is coupled by transformer 85 to rectifier 86. One side of the secondary winding of transformer 85 is connected to the anode electrode of rectifier 86 while the other side of the secondary winding is connected to the common side of the filter network including resistor 87 in parallel with capacitor 88. The other side of resistor 87 and capacitor 88 is further connected to the cathode electrode of rectifier 86 so that pulses through diode 86 change the level of voltage developed across capacitor 88. The charging time constant for capacitor 88 is primarily established by the impedance presented by the secondary winding of transformer 85 and is made relatively short so that pulses supplied to diode 86 cause a rapid change in the charge maintained by capacitor 88. The discharge time constant for capacitor 88 is established by relatively high valued resistor 87, transistor 90, resistor 91, and resistor 89, so that when charged to a given level, capacitor 88 tends to retain its charge for long periods of time.

The voltage developed across capacitor 88 is connected to the input base electrode of D.C. amplifier transistor 90. Variable voltage divider 89, connected between B+ lead 70 and ground, provides base voltage for transistor 90 and a biasing voltage for rectifier 86 to enable the level of D.C. to be set. Emitter bias is provided by resistor 91 so that a given quiescent conductive current for transistor 90 is maintained for a given charge across capacitor 88 and hence a set number of pulses supplied to diode 86. An increase in the number of pulses changes the charge of capacitor 88 and the conduction of transistor 90 to change its D.C. collector output voltage as developed across load resistor 93.

The output collector electrode of transistor 90 is connected to the input base electrode of transistor 92, connected as an emitter follower to provide power gain to operate gating circuits in the receiver. The collector electrode of transistor 92 is connected to ground and its emitter electrode is connected to B+ lead 70 by a variable resistor 95 and voltage divider 96. Collector-to-emitter current through transistor 92 develops a squelch control voltage across the variable resistor 95, and the tap point on resistor 95 allows the squelch operating level to be set to match the biasing of audio amplifier stage 25.

To provide for fast turn-on, slow turn-off of the squelch operation, the D.C. output signal of transistor 92 may be coupled through diode 97 across a filter network including capacitor 98 and resistor 99. Short time constant charging of capacitor 98 from the low impedance emitter follower configuration of transistor 92 through diode 97 allows a rapid increase in the D.C. level supplied to audio amplifier 25, while resistor 99 maintains this increased level for a predetermined time interval when the D.C. level drops.

When the limiters are set at such a level that all modulation information is stripped from the received sideband components except envelope minima crossover points, a substantially constant number of pulses are supplied to diode 86 from linear detector 34 and pulse amplifier 80. In the absence of noise these pulses provide a quiescent biasing voltage for transistor 90 across capacitor 88. Because of the short charging time constant of capacitor 88, the charge across capacitor 88 responds rapidly to an increase in pulses supplied by rectifier 86, as occurs in the presence of a decrease in the signal-to-noise ratio of the received signal. This changes the D.C. voltage developed across load resistor 93 of transistor 90, which is supplied as a squelch control voltage to audio amplifier 25 to mute the receiver. The long discharge time constant of capactor 88 allows its charge to be maintained relatively constant so that it represents an integration or a count of the number of pulses, and intermittent switching of the squelch control voltage does not occur.

Thus, it can be seen that the above described circuit responds to the total number of envelope minima crossover points to distinguish between noise and the modulation envelope of received sideband signals to provide a signal-to-noise operating squelch circuit. Because a carrier wave is not needed for operation, the invention is particularly useful in suppressed carrier single sideband receivers. However, the invention also provides squelch operation of increased sensitivity for communications systems adapted to receive other types of modulated signals.

I claim:

1. In a communications receiver for translating a modulated received signal, a signal-to-noise operating squelch circuit including in combination, signal limiting means, means coupling a portion of the translated signal of said receiver to said limiting means, with said limiting means clipping all amplitude information from said signal except modulation envelope minima which do not exceed the limiting level of said limiting means, detector means coupled to said limiting means to provide pulses in response to modulation envelope minima which do not exceed said limiting level, and means coupled to said detector means to provide a control voltage having a level indicative of the number of pulses provided by said dectector means, whereby an increased number of modulation envelope minima in the presence of noise results in a change in said control voltage level for muting said receiver.

2. In a communications receiver for translating a received modulated signal, a signal-to-noise operating squelch circuit including in combination, signal amplitude limiting means, means coupling a portion of the translated intermediate frequency signal of said receiver to said limiting means, with said limiting means clipping all amplitude modulation information from said intermediate frequency signal except modulation envelope minima which do not exceed the limiting level of said limiting means, linear detector means coupled to said limiting means to provide pulses in response to modulation envelope minima which do not exceed said limiting level, rectifier means coupled to said linear detector means to provide a direct current voltage having a level indicative of a number of pulses provided by said detector means, and means responsive to said voltage level to gate an audio amplifier stage in said receiver, whereby an increased number of modulation envelope minima occurring when only noise is present in the receiver increases said control voltage so that said gating means mutes said receiver.

3. In a communications receiver for translating a received modulated signal, a signal-to-noise operated squelch circuit including in combination, signal amplitude limiting means, means coupling a portion of the translated intermediate frequency signal of said receiver to said limiting means, with said limiting means removing all amplitude modulation information from said intermediate frequency signal except modulation envelope minima which do not exceed the limiting level of said limiting means, linear detector means coupled to said limiting means to provide pulses in response to modulation envelope minima which do not exceed said limiting level, and rectifier means coupled to said detector means to provide a direct current control voltage in response to said pulses, with said rectifier means including a filter network having a short charging time constant and a long discharge time constant, so that an increase in envelope minima of said intermediate frequency signal in the presence of noise produces an increase in said control voltage for squelch operation.

4. In a communications receiver for translating a modulated received signal, a signal-to-noise operating squelch circuit including in combination, signal amplitude limiting means, means coupling a portion of said translated signal to said limiting means, with said limiting means removing all amplitude modulation information from said signal except modulation envelope minima which do not exceed said limiting level, detector means coupled to said limiting means to provide pulses in response to modulation envelope minima which do not exceed the limiting level of said limiting means, rectifier means including a filter network having a short time constant charging circuit and a long time constant discharge circuit coupled to said detector means to provide a direct current voltage in response to said pulses, with the level of said voltage indicative of the number of modulation envelope minima, and control means responsive to a predetermined direct current voltage level to disable an audio stage in said receiver, whereby said receiver is muted when envelope minima produced by noise modulation of said translated signal are increased a predetermined amount.

5. In a communications receiver receptive of a suppressed carrier sideband signal, a squelch circuit including in combination, signal amplitude limiting means, means coupling a portion of said received sideband signal to said limiting means, with said limiting means clipping all amplitude modulated information from said sideband signal except modulation envelope minima which do not exceed the clipping level of said limiting means, linear envelope detector means coupled to said limiting means to provide output pulses in response to said modulation envelope minima, and means coupled to said detector means to provide a direct current control voltage indicative of the number of pulses provided by said detector means, whereby an increased number of modulation envelope minima produced by noise modulation of said sideband signal results in a change in said control voltage level to thereby mute said receiver in the presence of such noise.

6. In a communications receiver having an intermediate frequency section for translating suppressed carrier single sideband signals and further having an audio amplification section, a squelch circuit including in combination, signal amplitude limiting means, means coupling a portion of the intermediate frequency signal of the receiver to said limiting means, with said limiting means removing all amplitude modulation information from said intermediate frequency signal except modulation envelope minima which do not exceed said limiting level, a linear envelope detector coupled to said limiting means for providing pulses in response to modulation envelope minima which do not exceed said limiting level, means for amplifying said pulses, rectifier circuit means coupled to said amplifying means for providing a direct current voltage indicative of the number of said pulses, said rectifier circuit means including a filter network having a short charging time constant and a long discharge time constant, and control circuit means coupled between said filter network and a control terminal of said audio amplification section to mute said receiver as said direct current voltage exceeds a predetermined level, whereby increased modulation envelope minima when only noise is present increases said direct current voltage level to thereby provide squelch operation.

7. A signal-to-noise operating squelch circuit responsive to envelope modulation of the translated signal in a communications receiver, said circuit including in combination, signal amplitude limiting means, means coupling a portion of said translated signal to the input of said limiting means, linear envelope detector means coupled to the output of said limiting means, said detector means providing pulses indicative of modulation envelope minima which do not exceed the level of said limiting means, rectifying means coupled to the output of said detector means, with said rectifying means having a short charging time constant and a long discharge time constant output network to provide a direct current voltage level indicative of the number of pulses provided by said detector means, and control means responsive to said direct current voltage level to provide a control voltage for muting said receiver.

8. A signal-to-noise operating squelch circuit responsive to the envelope modulation crossover minima of the translated intermediate frequency signal in a communications receiver, said circuit including in combination, signal amplitude limiting means, means coupling a portion of said intermediate frequency signal to the input of said limiting means, linear envelope detector means coupled to the output of said limiting means, said detector means providing pulses indicative of modulation envelope crossover minima which do not exceed the level of said limiting means, rectifier means having a short charging time constant and a long discharge time constant output network, means coupling the output of said detector means to said rectifier means, and means coupled to the output network of said rectifier network to provide a control voltage for muting said receiver in the presence of excessive noise.

References Cited by the Examiner

UNITED STATES PATENTS 2,948,808 8/60 Neumann ____________ 325—402

DAVID G. REDINBAUGH, *Primary Examiner.*